US010696126B2

(12) United States Patent
Kato et al.

(10) Patent No.: US 10,696,126 B2
(45) Date of Patent: Jun. 30, 2020

(54) AIR-CONDITIONING UNIT FOR VEHICLE

(71) Applicant: DENSO CORPORATION, Kariya, Aichi-pref. (JP)

(72) Inventors: Shinya Kato, Kariya (JP); Yoshihiko Okumura, Kariya (JP); Ryo Kobayashi, Kariya (JP); Yasuhiro Sekito, Kariya (JP); Tetsuya Kono, Kariya (JP); Yuki Tsumagari, Kariya (JP); Kira Oiwa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/185,200

(22) Filed: Nov. 9, 2018

(65) Prior Publication Data

US 2019/0077213 A1    Mar. 14, 2019

Related U.S. Application Data

(63) Continuation of application No. PCT/JP2017/009773, filed on Mar. 10, 2017.

(30) Foreign Application Priority Data

May 12, 2016    (JP) ................. 2016-096279

(51) Int. Cl.
*B60H 1/00*    (2006.01)
*B60H 1/32*    (2006.01)

(52) U.S. Cl.
CPC .......... *B60H 1/00064* (2013.01); *B60H 1/00* (2013.01); *B60H 1/3233* (2013.01); *B60H 2001/00092* (2013.01); *B60H 2001/00107* (2013.01)

(58) Field of Classification Search
CPC ................ B60H 1/005; B60H 1/00028; B60H 1/00064; B60H 1/3233; B60H 1/32331; B60H 2001/00092; B60H 2001/00107
See application file for complete search history.

(56) References Cited

U.S. PATENT DOCUMENTS

| 3,918,637 A | 11/1975 | Kofink | |
| 6,261,172 B1* | 7/2001 | Shibata | .............. B60H 1/00028 454/121 |
| 6,431,257 B1* | 8/2002 | Sano | .................. B60H 1/00064 165/202 |

(Continued)

FOREIGN PATENT DOCUMENTS

| DE | 2231117 A1 | 1/1974 |
| DE | 10001629 A1 | 8/2000 |

(Continued)

*Primary Examiner* — Devon Russell
(74) *Attorney, Agent, or Firm* — Harness, Dickey & Pierce, P.L.C.

(57) ABSTRACT

An air-conditioning unit for a vehicle has a case, a blower, a cooling heat exchanger and a heating heat exchanger. The cooling heat exchanger is located upstream of the blower inside the case. The heating heat exchanger is located downstream of the blower inside the case. The ventilation passage includes a before-heating passage extending from an air discharge port of the blower toward an air inlet of the heating heat exchanger. The before-heating passage includes, as a part of the before-heating passage, a flow-changing path that is curved to change a flow direction of the air discharged from the blower.

15 Claims, 7 Drawing Sheets

(56) References Cited

U.S. PATENT DOCUMENTS

| | | | |
|---|---|---|---|
| 7,735,330 B2 * | 6/2010 | Richter | B60H 1/0005 |
| | | | 62/239 |
| 9,821,626 B2 * | 11/2017 | Wittmann | B60H 1/0005 |
| 2002/0117296 A1 * | 8/2002 | Smith | B60H 1/00028 |
| | | | 165/202 |
| 2003/0205370 A1 | 11/2003 | Kim | |
| 2005/0067158 A1 | 3/2005 | Ito et al. | |

FOREIGN PATENT DOCUMENTS

| | | | |
|---|---|---|---|
| DE | 102004046354 A1 | | 5/2005 |
| DE | 112012005228 T5 | | 9/2014 |
| JP | S44020026 Y1 | | 8/1969 |
| JP | S47019061 Y1 | | 6/1972 |
| JP | S58174314 U | | 11/1983 |
| JP | H11348536 A | | 12/1999 |
| JP | 2010100139 A | * | 5/2010 |
| WO | WO-2013087820 A1 | | 6/2013 |

* cited by examiner

AIR-CONDITIONING UNIT FOR VEHICLE

CROSS REFERENCE TO RELATED APPLICATION

The present application is a continuation application of International Patent Application No. PCT/JP2017/009773 filed on Mar. 10, 2017, which designated the United States and claims the benefit of priority from Japanese Patent Application No. 2016-096279 filed on May 12, 2016. The entire disclosures of all of the above applications are incorporated herein by reference.

TECHNICAL FIELD

The present disclosure relates to an air-conditioning unit for a vehicle. The air-conditioning unit performs an air conditioning for a cabin of the vehicle.

BACKGROUND ART

Air-conditioning units for vehicles have a blower, a cooling heat exchanger, and a heating heat exchanger. The blower generates airflow flowing toward the cabin. The cooling heat exchanger is located upstream of the blower and the heating heat exchanger is located downstream of the blower.

SUMMARY

This section provides a general summary of the disclosure, and is not a comprehensive disclosure of its full scope or all of its features.

In one aspect of the present disclosure, an air-conditioning unit for a vehicle, which performs an air conditioning for a cabin of the vehicle, has a case, a blower, a cooling heat exchanger, and a heating heat exchanger. The case defines a ventilation passage therein through which air flows. The blower is configured to cause a flow of air flowing in the case toward the cabin. The cooling heat exchanger is located upstream of the blower in the case and is configured to cool the air. The heating heat exchanger is located downstream of the blower in the case and is configured to heat the air.

The air-conditioning unit for a vehicle has the ventilation passage that includes a before-heating passage extending from an air outlet of the blower toward an air inlet of the heating heat exchanger. The before-heating passage includes, as a part of the before-heating passage, a flow-changing path that is curved to change a flow direction of the air discharged from the blower.

BRIEF DESCRIPTION OF DRAWINGS

The drawings described herein are for illustrative purposes only of selected embodiments and not all possible implementations, and are not intended to limit the scope of the present disclosure.

DESCRIPTION OF EMBODIMENTS

Figure 1:
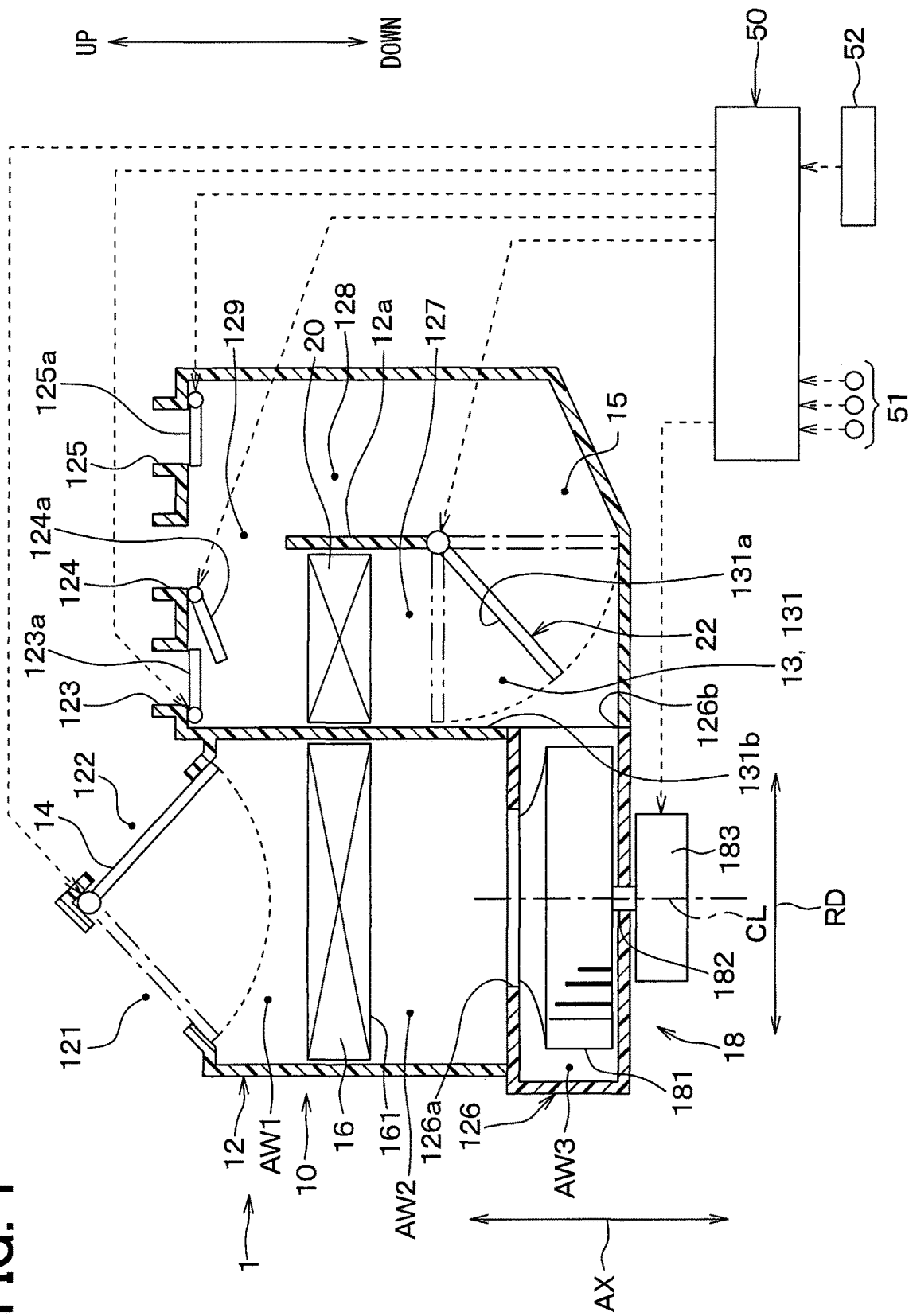
FIG. 1 is a schematic diagram of an air conditioner for a vehicle including an air-conditioning unit for the vehicle according to a first embodiment.

The inventors of the present disclosure studied air-conditioning units for vehicles with a blower located between a cooling heat exchanger and a heating heat exchanger and found that unpleasant humid air is possibly supplied into a cabin of the vehicle. Supplying such unpleasant humid air into the cabin is undesirable since the unpleasant humid air applies uncomfortable feeling or a feeling of strangeness to an occupant in the cabin.

The inventors further studied matters resulting in supplying the unpleasant humid air into the cabin in such air-conditioning units for vehicles. As a result, it is found that condensed water generated in the cooling heat exchanger is drawn into a fan of the blower easily and a part of the drawn condensed water is attached to the heating heat exchanger. The attached condensed water is evaporated on the heating heat exchanger, and the evaporated water results in generating the unpleasant humid air.

The present disclosure is unique and innovative in suppressing the generation of the unpleasant humid air.

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The following embodiments may be partially combined with each other even if such a combination is not explicitly described as long as there is no disadvantage with respect to such a combination.

First Embodiment

A first embodiment will be described with reference to FIGS. 1 to 4. In the drawings, indicator arrows showing up and down indicate an up-down direction with an air-conditioner installed in a vehicle.

An air conditioner 1 for a vehicle shown in FIG. 1 has an air-conditioning unit 10 for a vehicle, a controller 50, and a vapor-compression refrigeration circuit (not shown). The air-conditioning unit 10 for a vehicle performs an air conditioning for a cabin of the vehicle. The controller 50 controls various devices configuring the air-conditioning unit 10 for a vehicle. The refrigeration circuit includes a compressor, a condenser, a pressure-reducing mechanism, or the like. In the following description, the air-conditioning unit 10 for a vehicle will be referred to as the air-conditioning unit 10 for description purpose.

The air-conditioning unit 10 is arranged inside an instrument panel positioned in a front area of the cabin. As shown in FIG. 1, the air conditioning unit 10 includes a case 12, an inside-outside air door 14, an evaporator 16, a blower 18, a heater core 20, an air mix door 22, or the like.

The case 12 configures a housing of the air-conditioning unit 10 and defines a ventilation passage AW1-AW3, 13, 15, 127, 128, 129 therein through which air flows. The case 12 is formed of a resin (e.g., polypropylene) having a certain degree of elasticity and an excellent strength. The case 12 is an assembly of divided cases for certain reasons, e.g., for ease of resin molding and/or for ease of assembling inner components. Specifically, the divided cases are fastened to each other by a fastener member such as screw or clip to form the case 12.

The case 12 includes an outside-air inlet portion 121 and an inside-air inlet portion 122 arranged adjacent to each other. The outside-air inlet portion 121 takes in an air (i.e., outside air) from outside of the cabin. The inside-air inlet portion 122 takes in an air (i.e., inside air) from inside of the cabin. The inside-outside air door 14 is arranged in the case 12 to change opening degrees of the outside-air inlet portion 121 and the inside-air inlet portion 122. The inside-outside air door 14 is connected to the controller 50 and is operated based on control signals from the controller 50.

The case 12 further includes a defroster opening 123, a face opening 124, and a foot opening 125. The defroster opening 123 supplies air toward an inner surface of a windshield of the vehicle. The face opening 124 supplies air toward an upper body of an occupant in the cabin. The foot opening 125 supplies air toward a lower body of the occupant in the cabin.

A defroster switching door 123a is arranged in the defroster opening 123 to change an opening degree of, e.g., to open and close, the defroster opening 123. The defroster switching door 123a is connected to the controller 50 and is operated based on control signals from the controller 50.

A face switching door 124a is arranged in the face opening 124 to change an opening degree of, e.g., to open and close, the face opening 124. The face switching door 124a is connected to the controller 50 and is operated based on control signals from the controller 50.

A foot switching door 125a is arranged in the foot opening 125 to change an opening degree of, e.g., to open and close, the foot opening 125. The foot switching door 125a is connected to the controller 50 and is operated based on control signals from the controller 50. As an example, a single actuator may operate the defroster switching door 123a, the face switching door 124a, and the foot switching door 125a via a link mechanism.

The air-conditioning unit 10 has the evaporator 16 and the heater core 20 housed in the case 12. The evaporator 16 serves as a cooling heat exchanger and cools air flowing in the case 12. The heater core 20 serves as a heating heat exchanger and heats the air after passing through the evaporator 16. The blower 18 causes flows of air flowing into the cabin. In the air-conditioning unit 10 of the present embodiment, the blower 18 is arranged in the ventilation passage. Specifically, the ventilation passage includes a flow path AW3 defined between the evaporator 16 and the heater core 20, and the blower 18 is arranged in the flow path AW3.

As described above, the evaporator 16 serves as the cooling heat exchanger and cools the air flowing in the case 12. The evaporator 16 is arranged downstream of the outside-air inlet portion 121 and/or the inside-air inlet portion 122 so that air flowing from the outside-air inlet portion 121 and/or the inside-air inlet portion 122 passes through the evaporator 16.

In the present embodiment, the evaporator 16 is a low-pressure-side heat exchanger of the vapor-compression refrigeration circuit. That is, the evaporator 16 is a heat exchanger that cools air flowing in the case 12 in a manner that the evaporator 16 evaporates refrigerant having a low-temperature and a low-pressure by performing a heat exchange between the refrigerant and the air. The evaporator 16 has a thin shape with a rectangular outer shape. The evaporator 16 includes a heat exchanging portion in which the refrigerant and the air exchange heat with each other. In the present embodiment, a thickness direction of the heat exchanging portion is parallel to the up-down direction.

An area inside the case 12 and upstream of the evaporator 16 serves as an inside-outside air inlet path AW1 that directs at least one of the inside air and the outside air to the evaporator 16. An area inside the case 12 and downstream of the evaporator 16 serves as a cool-air passage AW2 through which cool air, which is cooled in the evaporator 16, flows.

The blower 18 is located downstream of the evaporator 16. The blower 18 includes a fan 181, a rotary shaft 182, and an electric motor 183. The fan 181 is housed in the case 12. The rotary shaft 182 is coupled with the fan 181. The electric motor 183 operates the rotary shaft 182 rotatably. The electric motor 183 is connected to the controller 50 and is operated based on control signals from the controller 50.

In the present embodiment, the blower 18 is arranged so that an axial direction AX of the rotary shaft 182 is parallel to the thickness direction of the evaporator 16. The axial direction AX of the rotary shaft 182 is a direction parallel to a rotational axis CL of the rotary shaft 182. The axial direction AX of the rotary shaft 182 is perpendicular to a radial direction RD of the rotary shaft 182.

The fan 181 is configured to draw air along the axial direction AX of the rotary shaft 182 and to blow the air along a direction intersecting with the axial direction AX of the rotary shaft 182. In the present embodiment, the fan 181 is a centrifugal fan characterized in that dynamic pressure is small and static pressure is large as compared to an axial fan. Specifically, the centrifugal fan draws air along the axial direction AX of the rotary shaft 182 and blows the air radially outward along the radial direction RD of the rotary shaft 182.

The centrifugal fan is classified into a sirocco fan, a radial fan, and a turbofan depending on shapes of blades. The centrifugal fan is characterized in that the static pressure rises in order of the sirocco fan, the radial fan, and the turbofan. In the present embodiment, the fan 181 is the turbofan having the highest static pressure among the sirocco fan, the radial fan, and the turbofan.

The case 12 defines a fan housing chamber 126 therein that houses the fan 181. The fan housing chamber 126 includes an air suction port 126a at an end along the axial direction AX of the rotary shaft 182. The air suction port 126a guides air to flow into the fan 181. The fan housing chamber 126 further includes an air discharge port 126b configured to discharge airflow, which is caused in the fan 181, radially outward along the radial direction RD of the rotary shaft 182. An inside of the fan housing chamber 126 serves as the flow path AW3 that guides air flowing from the cool-air passage AW2 into the air suction port 126a to flow out of the blower 18 from the air discharge port 126b. In the flow path AW3, a flow direction of the air flowing from the cool-air passage AW2 is changed so that the air takes a turn by the fan 181 to trace an L-shaped route.

In the present embodiment, the blower 18 is arranged so that the air suction port 126a faces an air outlet surface 161 of the evaporator 16. As such, the air after passing through the evaporator 16 flows into the air suction port 126a easily. In other words, the evaporator 16 in the present embodiment is arranged so that the air outlet surface 161 faces the air suction port 126a of the blower 18. As such, the evaporator 16 is visible when viewed from the air suction port 126a of the blower 18.

Specifically, the evaporator 16 and the blower 18 in the present embodiment are arranged so that the air outlet surface 161 of the evaporator 16 overlaps with the air suction port 126a of the blower 18 along the axial direction AX of the rotary shaft 182. That is, the evaporator 16 and the blower 18 in the present embodiment are arranged so that the cool-air passage AW2 defined between the air outlet surface 161 of the evaporator 16 and the air suction port 126a of the blower 18 extends straight.

An area in the case 12 and downstream of the air discharge port 126b of the blower 18 serves as a before-heating passage 13 that directs air discharged from the blower 18 to the heater core 20. The before-heating passage 13 is included in the ventilation passage defined in the case 12 and extends from the air discharge port 126b of the blower 18 to the heater core 20.

The heater core 20 serves as the heating heat exchanger and is configured to heat air after passing through the evaporator 16. In the present embodiment, the heater core 20 is a heat exchanger configured to heat the air after passing through the evaporator 16. The heater core 20 uses cooling water, which cools an internal combustion engine, as a heat source and heats the air by the cooling water. The heater core 20 has a thin shape with a rectangular outer shape. Similar to the evaporator 16, the heater core 20 includes a heat exchanging portion in which the refrigerant and the air exchange heat with each other. In the present embodiment, a thickness direction of the heat exchanging portion is parallel to the up-down direction.

The before-heating passage 13 includes a flow-changing path 131. The flow-changing path 131 is curved to change a flow direction of air flowing from the air discharge port 126b of the blower 18. In the present embodiment, the before-heating passage 13 is formed in an L-shape to serve as the flow-changing path 131. When air discharged from the blower 18 along the radial direction RD of the rotary shaft 182 flows into the before-heating passage 13, the before-heating passage 13 changes the flow direction of the air, i.e., the radial direction Rd, to a direction parallel to the axial direction AX of the rotary shaft 182. In the present embodiment, the flow-changing path 131 defines an upstream flow-changing path that guides the air discharged from the blower 18 to flow along a direction intersecting with the flow direction of the air flowing out of the blower 18.

Specifically, the flow-changing path 131 in the present embodiment is defined by wall surfaces including a door plate surface 131a of the air mix door 22 and a passage wall surface 131b of a partition wall partitioning the cool-air passage AW2 from the before-heating passage 13.

In the present embodiment, a downstream portion of the before-heating passage 13 and the cool-air passage AW2, which extends from the evaporator 16 to the air suction port 126a of the blower 18, are arranged side-by-side along the radial direction RD of the rotary shaft 182. As such, in the air-conditioning unit 10 of the present embodiment, air flowing into the air suction port 126a of the blower 18 takes an U-turn while flowing through an inside of the blower 18 and the before-heating passage 13. In the present embodiment, the before-heating passage 13 is branched, at a downstream end, into a pre-bypass passage 15 that directs air to a cool-air bypass passage 128 described later.

The case 12 defines a warm-air passage 127 and the cool-air bypass passage 128 therein and downstream of the before-heating passage 13. The warm-air passage 127 guides air discharged from the blower 18 to the heater core 20. The cool-air bypass passage 128 guides air discharged from the blower 18 to bypass the heater core 20.

The warm-air passage 127 and the cool-air bypass passage 128 are partitioned by a partition member 12a disposed in the case 12. That is, the warm-air passage 127 and the cool-air bypass passage 128 are located side-by-side in the case 12 and downstream of the before-heating passage 13.

In the present embodiment, the warm-air passage 127 is connected to the passage wall surface 131b that defines an inner portion of the flow-changing path 131 in the before-heating passage 13. That is, a wall surface of the case 12 defining the warm-air passage 127 is connected to the passage wall surface 131b of the case 12 defining the inner portion of the before-heating passage 13. The inner portion of the before-heating passage 13 may be also referred to as a radially inner side of a corner in which air takes a turn, i.e., a flow direction of the air is changed.

In the present embodiment, the cool-air bypass passage 128 is connected to the pre-bypass passage 15 that is defined in an outer portion of the flow-changing path 131 inside the before-heating passage 13. That is, a wall surface of the case 12 defining the cool-air bypass passage 128 is connected to a wall surface of the case 12 defining the outer portion of the before-heating passage 13. The outer portion of the before-heating passage 13 may be also referred to as a radially outer side of a corner in which air turns, i.e., a flow direction of the air is changed.

Here, in the air-conditioning unit 10 of the present embodiment, the blower 18 and the heater core 20 are arranged not to overlap with each other along the radial direction RD of the rotary shaft 182, i.e., along the flow direction of air flowing out of the blower 18.

Specifically, when virtually extending the air discharge port 126b of the blower 18 along the radial direction RD of the rotary shaft 182, the heater core 20 is positioned outside a virtual area defined inside a path taken by the extended air discharge port 126b. That is, the heater core 20 is positioned in the case 12 not to be visible from the air discharge port 126b of the blower 18.

In the air-conditioning unit 10 of the present embodiment, the cool-air passage AW2 in which the evaporator 16 is disposed, the warm-air passage 127, and the cool-air bypass passage 128 are located in the case 12 to overlap with each other along the radial direction RD of the rotary shaft 182. In other words, in the air-conditioning unit 10 of the present embodiment, the cool-air passage AW2 in which the evaporator 16 is disposed, the warm-air passage 127, and the cool-air bypass passage 128 are located in the case 12 side-by-side along the radial direction RD of the rotary shaft 182.

A mixing space 129 is defined downstream of the warm-air passage 127 and the cool-air bypass passage 128 so that air after passing through the warm-air passage 127 and air after passing through the cool-air bypass passage 128 are mixed in the mixing space 129.

The air mix door 22 is disposed in the before-heating passage 13 defined upstream of the warm-air passage 127 and the cool-air bypass passage 128. The air mix door 22 adjusts a ratio between a volume of air flowing into and passing through the warm-air passage 127 and a volume of air flowing into and passing through the cool-air bypass passage 128.

In the present embodiment, the air mix door 22 is configured by a cantilever door that includes a plate member and a door shaft coupled to one side of the plate member. Alternatively, the air mix door 22 may be a slide door that includes a plate member that is slidable along a plate surface direction. The air mix door 22 is rotatable between a maximum cooling position where the air mix door 22 fully closes the warm-air passage 127 and fully opens the cool-air bypass passage 128 and a maximum heating position where the air mix door 22 fully opens the warm-air passage 127 and fully closes the cool-air bypass passage 128. In the present embodiment, the operation of the air mix door 22 is controlled by a control signal output from the controller 50.

FIG. 1 shows a situation that the air mix door 22 is positioned at an intermediate position where the air mix door 22 opens both of the warm-air passage 127 and the cool-air bypass passage 128. In FIG. 1, a situation that the air mix door 22 is positioned at the maximum heating position is shown by a one-dot line. In addition, in FIG. 1, a situation that the air mix door 22 is positioned at the maximum cooling position is shown by a two-dot line. This similarly applied to the drawings other than FIG. 1.

The controller 50 in the present embodiment will be described hereafter. The controller 50 includes a microcomputer including a memory such as CPU, ROM, RAM and the like, and peripheral circuits of the microcomputer. Various devices for air conditioning are connected to an output side of the controller 50 so that the controller 50 performs various calculations and processes based on control programs stored in the memory to control operations of the various devices. The memory of the controller 50 is configured by a non-transitional physical storage medium.

Sensors 51 for the air conditioning are connected to an input side of the controller 50. Specifically, the controller 50 is connected with sensors configured to detect environmental state inside and outside the vehicle. Such sensors may be an inside-air sensor configured to detect an inside-air temperature, an outside-air sensor configured to detect an outside-air temperature, an insolation sensor configured to detect an amount of insolation into the cabin, and the like.

The input side of the controller 50 is further connected with an operation panel 52 in which various operation switches for the air conditioning are arranged. Operation signals output from the various operation switches of the operation panel 52 are input to the controller 50. The operation panel 52 includes, as the various operation switches for the air conditioning, an actuation switch for the air conditioner 1 for a vehicle, a temperature setting switch configured to set a target temperature, an A/C switch configured to set whether the evaporator 16 cools air, and the like.

The output side of the controller 50 is further connected with object devices to control. The object devices includes the inside-outside air door 14, the blower 18, the air mix door 22, the defroster switching door 123a, the face switching door 124a, and the foot switching door 125a.

The controller 50 controls the object devices such as the blower 18 and the air mix door 22 based on detection signals output from the sensors 51 for the air conditioning and operation signals output from the operation panel 52.

As an example, the controller 50 controls the air mix door 22 to move to the maximum heating position when a target discharge temperature TAO rises in a heating mode and controls the air mix door 22 to move to the maximum cooling position when the target discharge temperature TAO falls in a cooling mode. As an example, the controller 50 controls the air mix door 22 to move to the intermediate position under a condition that a temperature difference between the outside-air temperature and the inside-air temperature is small, e.g., in intermediate seasons such as spring and autumn.

The controller 50 controls the face switching door 124a and the foot switching door 125a to adjust a distribution of temperature in the cabin so that the occupant feels warm with the foot and cool with the head. As an example, the controller 50 controls the foot switching door 125a to open the foot opening 125 in a situation where the target discharge temperature TAO is high and controls the face switching door 124a to open the face opening 124 in a situation where the target discharge temperature TAO is low.

Operations of the air-conditioning unit 10 in the present embodiment will be described hereafter with reference to FIG. 2 to FIG. 4. Specifically, the operations of the air-conditioning unit 10, in the present embodiment, (i) when the air mix door 22 is at the intermediate in the cooling mode, (ii) when the air mix door 22 is at the maximum cooling position in the cooling mode, and (iii) when the air mix door 22 is at the maximum heating position in the heating mode will be described.

First, the operation of the air conditioning unit 10 when the air mix door 22 is at the intermediate position in the cooling mode will be described with reference to FIG. 2. FIG. 2 shows, as an example, a configuration in a situation where the controller 50 controls the inside-outside air door 14 to open the outside-air inlet portion 121 and controls the face switching door 124a to open the face opening 124.

Figure 2:
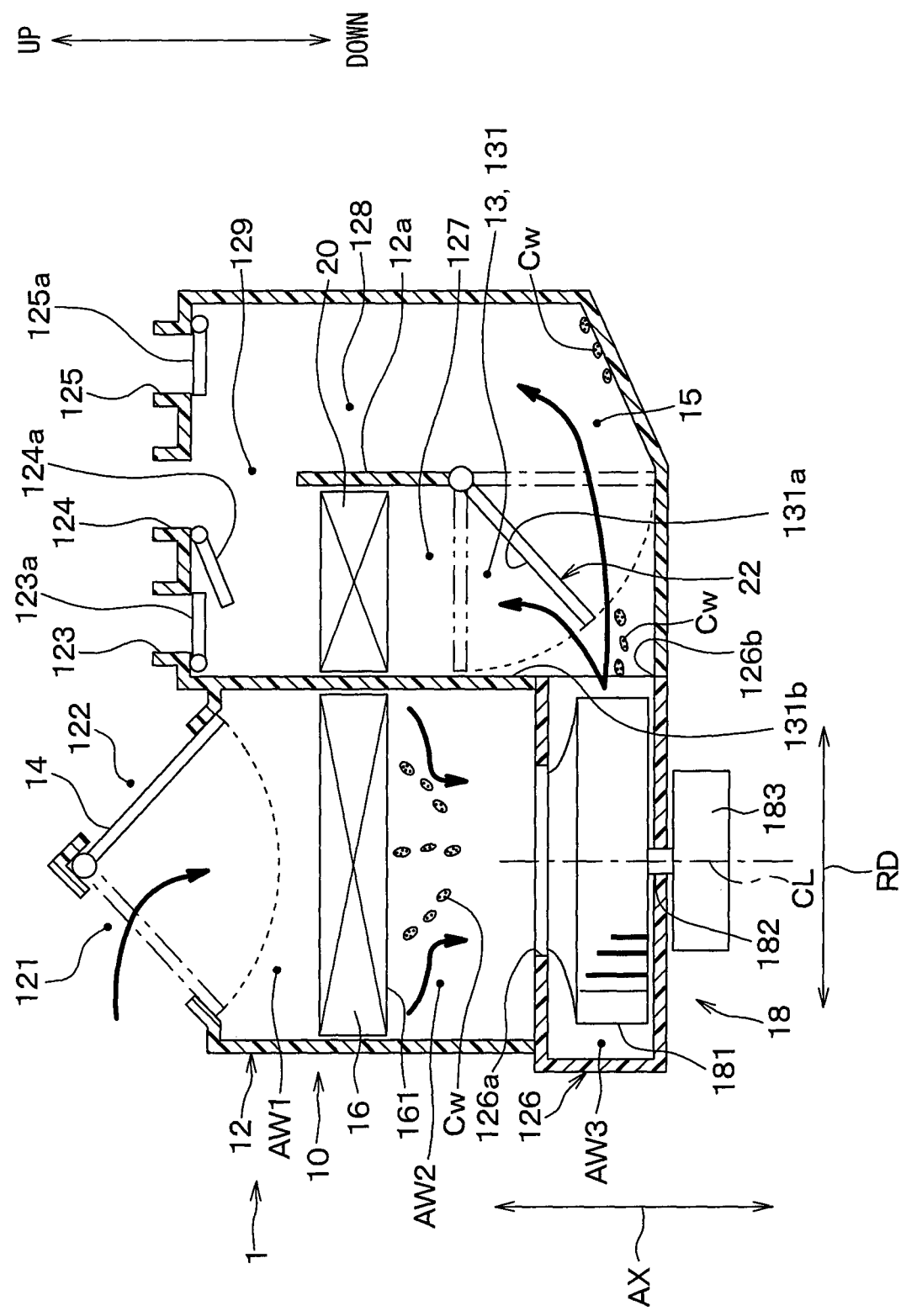
FIG. 2 is a cross-sectional view schematically illustrating flows of air in the air-conditioning unit for a vehicle with an air mix door located at an intermediate position.

As shown in FIG. 2, air is taken into the case 12 from the outside-air inlet portion 121 when the blower 18 is rotating. The air is cooled, while passing through the evaporator 16, by exchanging heat with the refrigerant circulating in the evaporator 16. In this situation, moisture in the air is condensed and attached to a surface of the evaporator 16 as condensed water Cw.

Cooled air cooled in the evaporator 16 is drawn into the blower 18 along the axial direction Ax of the rotary shaft 182 together with the condensed water Cw generated on the surface of the evaporator 16. The air containing the condensed water Cw is drawn into the blower 18 and discharged from the blower 18 radially outward along the radial direction RD of the rotary shaft 182.

The air discharged from the blower 18 turns, i.e., a flow direction of the air is changed, in the flow-changing path 131 included in the before-heating passage 13, and then flows to both of the warm-air passage 127 and the cool-air bypass passage 128. The condensed water Cw discharged from the blower 18 with the air flows straight along the radial direction RD of the rotary shaft 182 due to inertia and is attached to an inner wall surface defining the outer portion of the corner in the before-heating passage 13. The inner wall surface is, i.e., a passage wall surface defining the pre-bypass passage 15. That is, when the air containing the condensed water Cw is discharged from the blower 18, the condensed water Cw is separated from the air in the before-heating passage 13 and only the air flows to both of the warm-air passage 127 and the cool-air bypass passage 128. As such, according to the air-conditioning unit 10 in the present embodiment, the condensed water Cw hardly flows into the warm-air passage 127 in which the heater core 20 is disposed.

The air flowing into the warm-air passage 127 is heated in the heater core 20 and mixed in the mixing space 129 with air after passing through the cool-air bypass passage 128. Thus, a temperature of the mixed air is adjusted to be a required temperature. The air, of which temperature is adjusted in the mixing space 129 to be the required temperature, is supplied into the cabin via the face opening 124.

Next, the operation of the air conditioning unit 10 when the air mix door 22 is at the maximum cooling position in the cooling mode will be described with reference to FIG. 3. FIG. 3 shows, as an example, a configuration in a situation where the controller 50 controls the inside-outside air door 14 to open the outside-air inlet portion 121 and controls the face switching door 124a to open the face opening 124.

Figure 3:
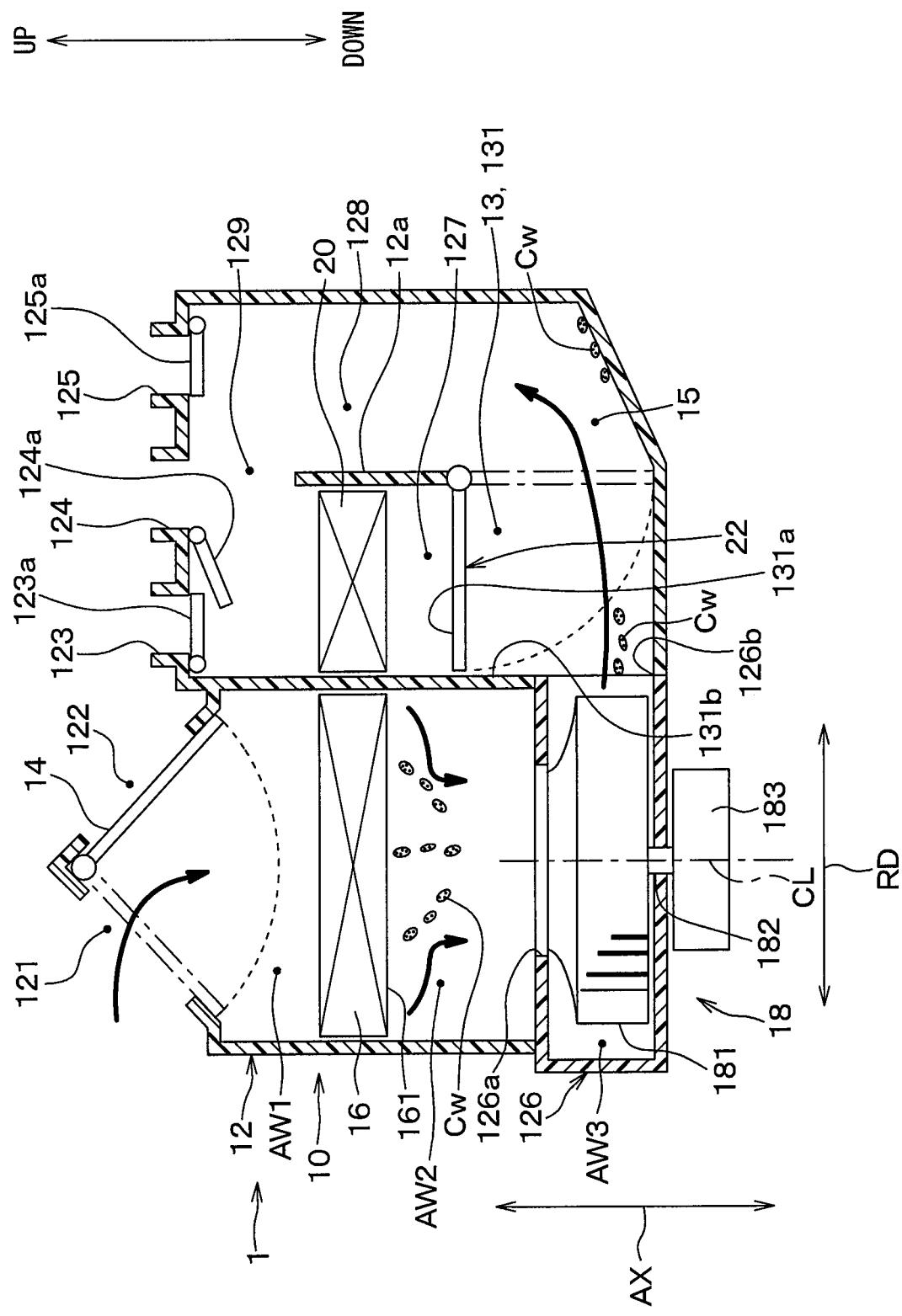
FIG. 3 is a cross-sectional view schematically illustrating flows of air in the air-conditioning unit for a vehicle with the air mix door located at a maximum-cooling position.

As shown in FIG. 3, air is taken into the case 12 from the outside-air inlet portion 121 when the blower 18 is rotating. The air is cooled, while passing through the evaporator 16, by exchanging heat with the refrigerant circulating in the evaporator 16. In this situation, moisture in the air is condensed and attached to the surface of the evaporator 16 as the condensed water Cw.

Cooled air cooled in the evaporator 16 is drawn into the blower 18 along the axial direction Ax of the rotary shaft 182 together with the condensed water Cw generated on the surface of the evaporator 16. The air containing the condensed water Cw is drawn into the blower 18 and discharged from the blower 18 radially outward along the radial direction RD of the rotary shaft 182.

The air discharged from the blower 18 turns, i.e., a flow direction of the air is changed, in the before-heating passage 13 and then flows to the cool-air bypass passage 128. The condensed water Cw discharged from the blower 18 with the air flows straight along the radial direction RD of the rotary shaft 182 due to inertia and is attached to an inner wall surface defining the outer portion of the corner in the before-heating passage 13. The inner wall surface is, i.e., a passage wall surface defining the pre-bypass passage 15. That is, when the air containing the condensed water Cw is discharged from the blower 18, the condensed water Cw is separated from the air in the before-heating passage 13 and only the air flows to the cool-air bypass passage 128. The air flowing into the cool-air bypass passage 128 is supplied into the cabin via the mixing space 129 and the face opening 124.

Generally, a volume of air discharged from the blower 18 is set larger in the situation where the air mix door 22 is at the maximum cooling position in the cooling mode than in the situation where the air mix door 22 is at the maximum heating position in the heating mode.

In the air-conditioning unit 10 of the present embodiment, the cool-air bypass passage 128 is connected to the pre-bypass passage 15 located in the outer portion of the corner in the before-heating passage 13. As such, when the air mix door 22 is at the maximum cooling position in the cooling mode, a pressure loss of the air, which is caused in the before-heating passage 13 when the air passes through the cool-air bypass passage 128, can be reduced. That is, the air-conditioning unit 10 in the present embodiment is configured so that a volume of air supplied into the cabin can be secured by reducing the pressure loss of the air caused in the before-heating passage 13 when the air mix door 22 is at the maximum cooling position in the cooling mode.

Next, the operation of the air conditioning unit 10 when the air mix door 22 is at the maximum heating position in the heating mode will be described with reference to FIG. 4. FIG. 4 shows, as an example, a configuration in a situation where the controller 50 controls the inside-outside air door 14 to open the outside-air inlet portion 121 and controls the foot switching door 125a to open the foot opening 125 It is presumed that the operation of the refrigeration circuit is stopped and the evaporator 16 does not exert a heat-absorbing performance in the heating mode.

Figure 4:
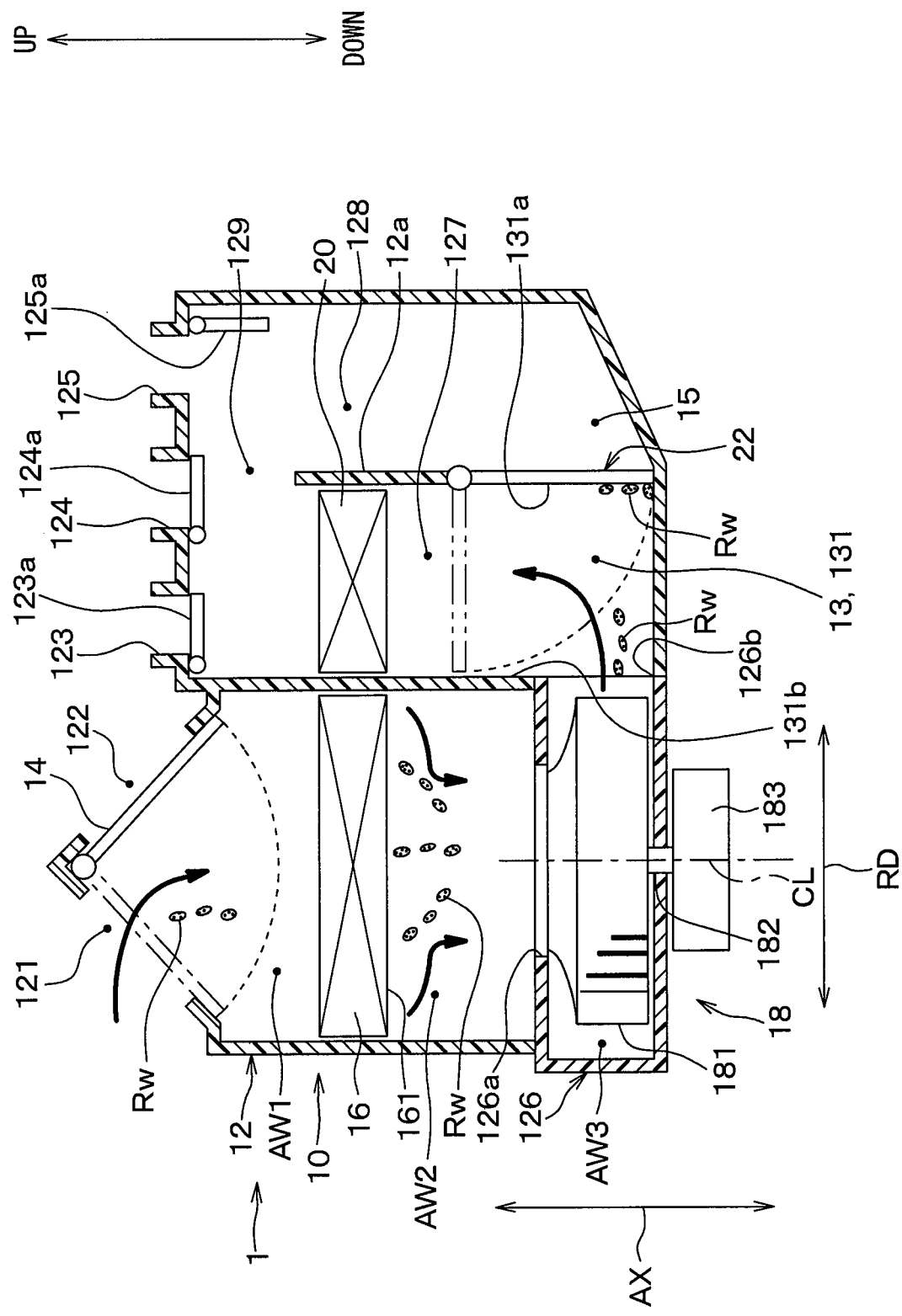
FIG. 4 is a cross-sectional view schematically illustrating flows of air in the air-conditioning unit for a vehicle with the air mix door located at a maximum-heating position.

As shown in FIG. 4, air is taken into the case 12 from the outside-air inlet portion 121 when the blower 18 is rotating. In this situation, the air flowing from the outside-air inlet portion 121 may contain rainwater Rw coming from outside of the vehicle.

When air containing the rainwater Rw flows from the outside-air inlet portion 121, the air together with the rainwater Rw is drawn into the blower 18 along the axial direction AX of the rotary shaft 182 via the evaporator 16. The air containing the rain water Rw is drawn into the blower 18 and discharged from the blower 18 radially outward along the radial direction RD of the rotary shaft 182.

The air discharged from the blower 18 turns, i.e., a flow direction of the air is changed, in the flow-changing path 131 included in the before-heating passage 13 and then flows to the warm-air passage 127. The rainwater Rw discharged from the blower 18 with the air flows straight along the radial direction RD of the rotary shaft 182 due to inertia and is attached to the door plate surface 131a of the air mix door 22. That is, when the air containing the rainwater Rw is discharged from the blower 18, the rainwater Rw is separated from the air in the before-heating passage 13 and only the air flows to the warm-air passage 127. As such, according to the air-conditioning unit 10 in the present embodiment, the rainwater Rw hardly flows into the warm-air passage 127 in which the heater core 20 is disposed.

The air flowing into the warm-air passage 127 is heated in the heater core 20 to have a required temperature. The air, after passing through the heater core 20, is supplied into the cabin via the mixing space 129 and the foot opening 125.

In the air-conditioning unit 10 of the present embodiment, the case 12 defines the before-heating passage 13 therein extending from the air discharge port 126b of the blower 18 to the air inlet of the heater core 20, and an entire of the before-heating passage 13 serves as the flow-changing path 131.

As such, even when air containing water flows in the case 12, the water can be attached to a wall surface defining the flow-changing path 131 due to inertia when the air containing the water passes through the flow-changing path 131 of the before-heating passage 13. Therefore, it can be suppressed that water is attached to the heater core 20 located downstream of the before-heating passage 13.

Thus, according to the air-conditioning unit 10 in the present embodiment, it can be suppressed that water is evaporated in the heater core 20. As a result, it can be suppressed that unpleasant humid air is supplied into the cabin.

Specifically, in the air-conditioning unit 10 of the present embodiment, the blower 18 (i.e., the fan 181) draws air along the axial direction AX of the rotary shaft 182 and discharges the air along a direction intersecting with the axial direction AX of the rotary shaft 182.

In such configuration that the fan 181 draws air along the axial direction AX of the rotary shaft 182 and discharge the air along a direction intersecting with the axial direction AX of the rotary shaft 182, airflows discharged from the fan 181 include an airflow flowing along the radial direction RD of the rotary shaft 182.

Considering such characteristics of the fan 181 discharging air as described above, the air-conditioning unit 10 in the present embodiment is configured so that the fan 181 and the heater core 20 are not overlap with each other along the radial direction RD of the rotary shaft 182. As such, even when air discharged from the fan 181 contains water, the water can be prevented from attaching to the heater core 20.

Here, when the flow-changing path 131 is defined downstream of the air discharge port 126b of the blower 18, performance of the fan 181 may deteriorate drastically since the flow-changing path 131 results in a ventilation resistance. Such deterioration of the performance of the fan 181 may be remarkable when using a fan having a large ram pressure and a small static pressure. In other words, when using a fan having a small ram pressure and a large static pressure, performance of the fan hardly deteriorate even when a ventilation resistance is caused on a downstream side of the air discharge port 126b.

As such, in the present embodiment, the fan 181 of the blower 18 is configured by the turbofan having highest static pressure among centrifugal fans. Therefore, the deterioration of the performance of the fan 181 can be suppressed although the before-heating passage 13 defined downstream of the blower 18 serves as the flow-changing path 131 in the present embodiment.

Incidentally, when the air containing water flows in the case 12, the water is easily directed to the outer portion of the corner in the flow-changing path 131 of the before-heating passage 13 due to inertia when passing through the flow-changing path 131 of the before-heating passage 13.

As such, in the air-conditioning unit 10 of the present embodiment, the warm-air passage 127 is disposed in the inner portion of the flow-changing path 131 in the before-heating passage 13 and the cool-air bypass passage 128 is defined in the outer portion of the flow-changing path 131 in the before-heating passage 13. Therefore, water hardly comes into the warm-air passage 127. As a result, it can be suppressed more effectively that water is attached to the heater core 20 disposed in the warm-air passage 127.

In the air-conditioning unit 10 of the present embodiment, the air outlet surface 161 of the evaporator 16 faces the air suction port 126a of the blower 18. As such, the cool-air passage AW2 can be defined not to be curved between the evaporator 16 and the blower 18. Therefore, a cause of energy loss can be suppressed in the ventilation passage defined in the case 12.

Second Embodiment

Figure 5:
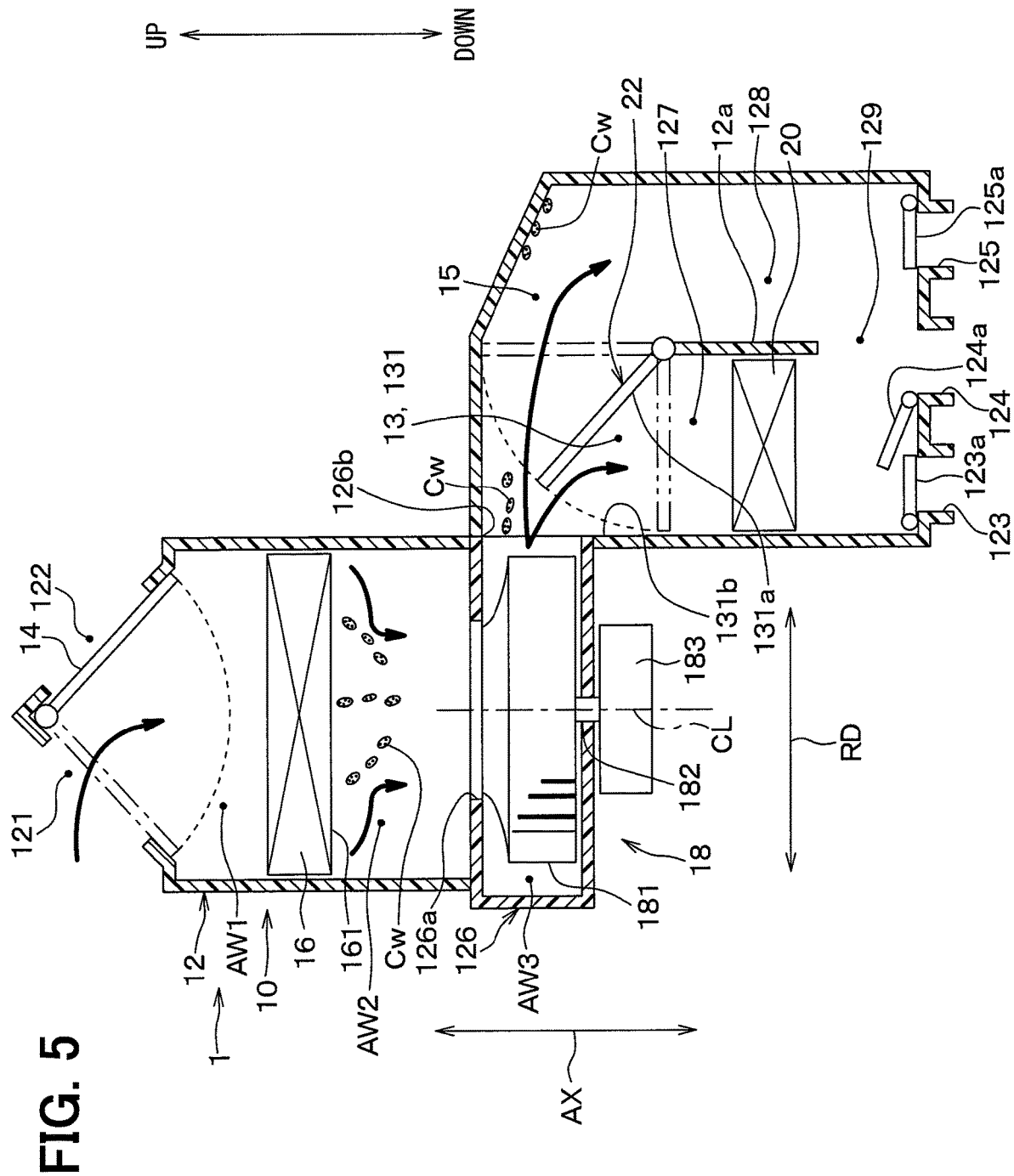
FIG. 5 is a cross-sectional view schematically illustrating an air-conditioning unit for a vehicle according to a second embodiment.

An air-conditioning unit 10 in a second embodiment will be described hereafter with reference to FIG. 5. FIG. 5 is a cross-sectional view schematically illustrating the air-conditioning unit 10 with the air mix door 22 located at the intermediate position. FIG. 5 shows, as an example, a configuration in a situation where the controller 50 controls the inside-outside air door 14 to open the outside-air inlet portion 121 and controls the face switching door 124a to open the face opening 124.

As shown in FIG. 5, in the present embodiment, the before-heating passage 13 is formed in a curved shape to serve as the flow-changing path 131 similar to the first embodiment. When air discharged from the blower 18 along the radial direction RD of the rotary shaft 182 flows into the before-heating passage 13, the before-heating passage 13 changes the flow direction of the air, i.e., the radial direction Rd, to a direction parallel to the axial direction AX of the rotary shaft 182. In the present embodiment, the flow-changing path 131 defines an upstream flow-changing path that guides the air discharged from the blower 18 to flow along a direction intersecting with the flow direction of the air flowing out of the blower 18. In the present embodiment, the flow-changing path 131 is defined by wall surfaces including the door plate surface 131a of the air mix door 22 and the passage wall surface 131b connected to the warm-air passage 127.

However, the before-heating passage 13 in the present embodiment is defined as the flow-changing path 131 curved toward an opposite direction opposite to that of the flow-changing path 131 in the first embodiment. In the present embodiment, a downstream portion of the before-heating passage 13 and the cool-air passage AW2, which extends from the evaporator 16 to the air suction port 126a of the blower 18, are arranged not to overlap with each other along the radial direction RD of the rotary shaft 182.

As such, in the present embodiment, the case 12 defines a curved ventilation passage therein so that a flow direction of air drawn into the blower 18 via the air suction port 126a becomes parallel to a flow direction of air after passing through the before-heating passage 13.

Specifically, in the present embodiment, the flow path AW3 changes a flow direction of air to a first direction and the flow-changing path 131 of the before-heating passage 13 changes a flow direction of air to a second direction opposite to the first direction. As an example, the flow path AW3 makes air to take a turn at 90° and the flow-changing path 131 of the before-heating passage 13 makes air to take a turn at −90°. As such, the case 12 defines the curved ventilation passage therein so that a flow direction of air drawn into the blower 18 via the air suction port 126a becomes parallel to a flow direction of air after passing through the before-heating passage 13.

Other structures are similar to corresponding structures of the first embodiment. In the air-conditioning unit 10 of the present embodiment, air is taken into the case 12 from the outside-air inlet portion 121 when the blower 18 is rotating. The air is cooled, while passing through the evaporator 16, by exchanging heat with the refrigerant circulating in the evaporator 16. In this situation, moisture in the air is condensed and attached to the surface of the evaporator 16 as the condensed water Cw.

Cooled air cooled in the evaporator 16 is drawn into the blower 18 along the axial direction Ax of the rotary shaft 182 together with the condensed water Cw generated on the surface of the evaporator 16. The air containing the condensed water Cw is drawn into the blower 18 and discharged from the blower 18 radially outward along the radial direction RD of the rotary shaft 182.

The air discharged from the blower 18 turns, i.e., a flow direction of the air is changed, in the flow-changing path 131 included in the before-heating passage 13, and then flows to both of the warm-air passage 127 and the cool-air bypass passage 128. The condensed water Cw discharged from the blower 18 with the air flows straight along the radial direction RD of the rotary shaft 182 due to inertia and is attached to an inner wall surface defining the outer portion of the corner in the before-heating passage 13. The inner wall surface is, i.e., a passage wall surface defining the pre-bypass passage 15. That is, when the air containing the condensed water Cw is discharged from the blower 18, the condensed water Cw is separated from the air in the before-heating passage 13 and only the air flows to both of the warm-air passage 127 and the cool-air bypass passage 128.

As such, according to the air-conditioning unit 10 in the present embodiment, the condensed water Cw hardly flows into the warm-air passage 127 in which the heater core 20 is disposed, similar to the air-conditioning unit 10 of the first embodiment.

Thus, according to the air-conditioning unit 10 of the present embodiment, it can be suppressed that water is attached to the heater core 20 located downstream of the before-heating passage 13. As a result, it can be suppressed that unpleasant humid air is supplied into the cabin. That is, the air-conditioning unit 10 in the present embodiment and the air-conditioning unit 10 in the first embodiment have common configurations. Therefore, the air-conditioning unit 10 in the present embodiment can obtain the same effects as the air-conditioning unit 10 in the first embodiment by the common configurations.

As such, in the air-conditioning unit 10 of the present embodiment, the case 12 defines a curved ventilation passage therein so that a flow direction of air drawn into the blower 18 via the air suction port 126a becomes parallel to a flow direction of air after passing through the before-heating passage 13. Therefore, a cause of energy loss can be suppressed in the ventilation passage defined in the case 12.

Third Embodiment

Figure 6:
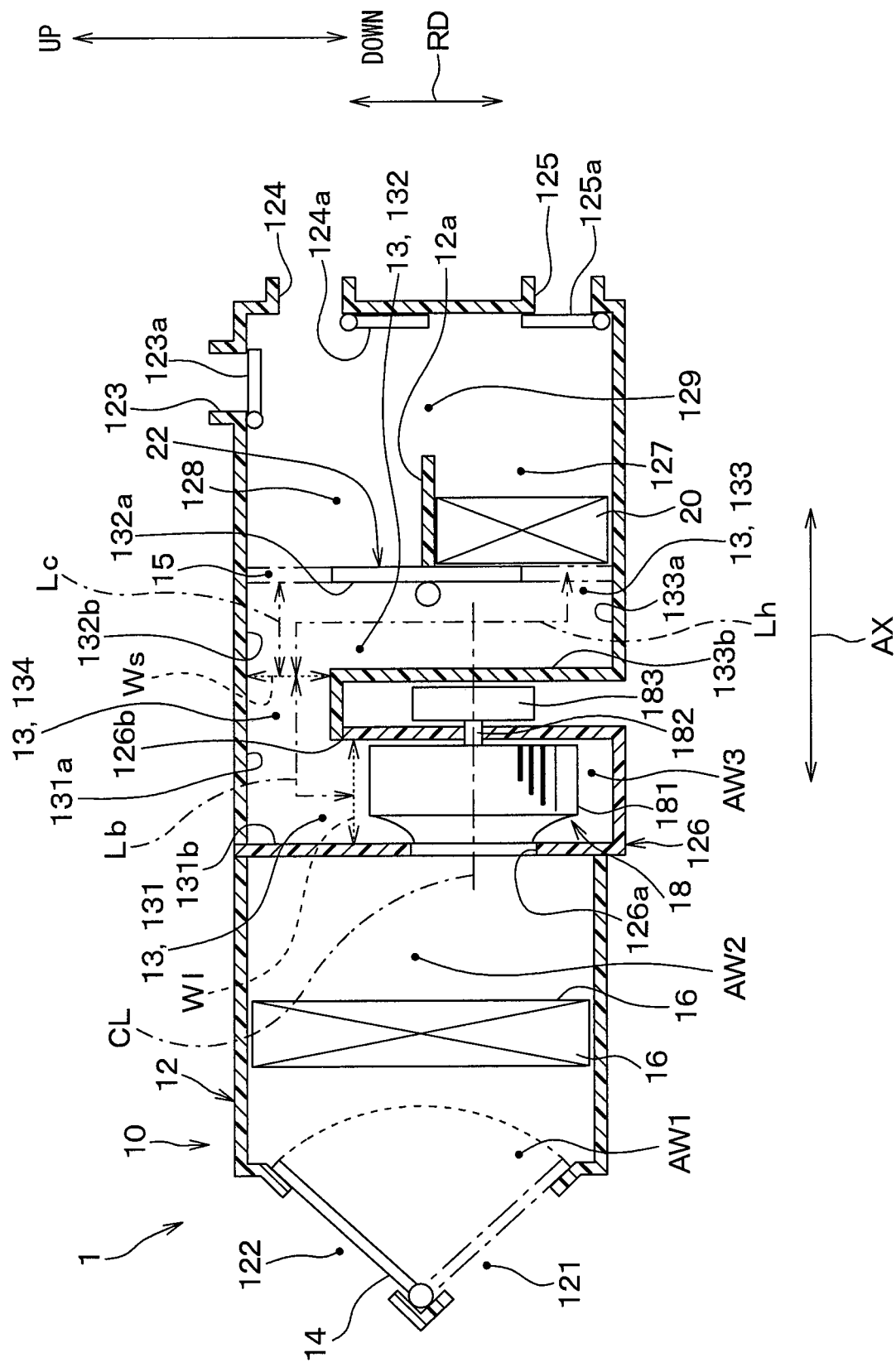
FIG. 6 is a cross-sectional view schematically illustrating an air-conditioning unit for a vehicle according to a third embodiment.
Figure 7:
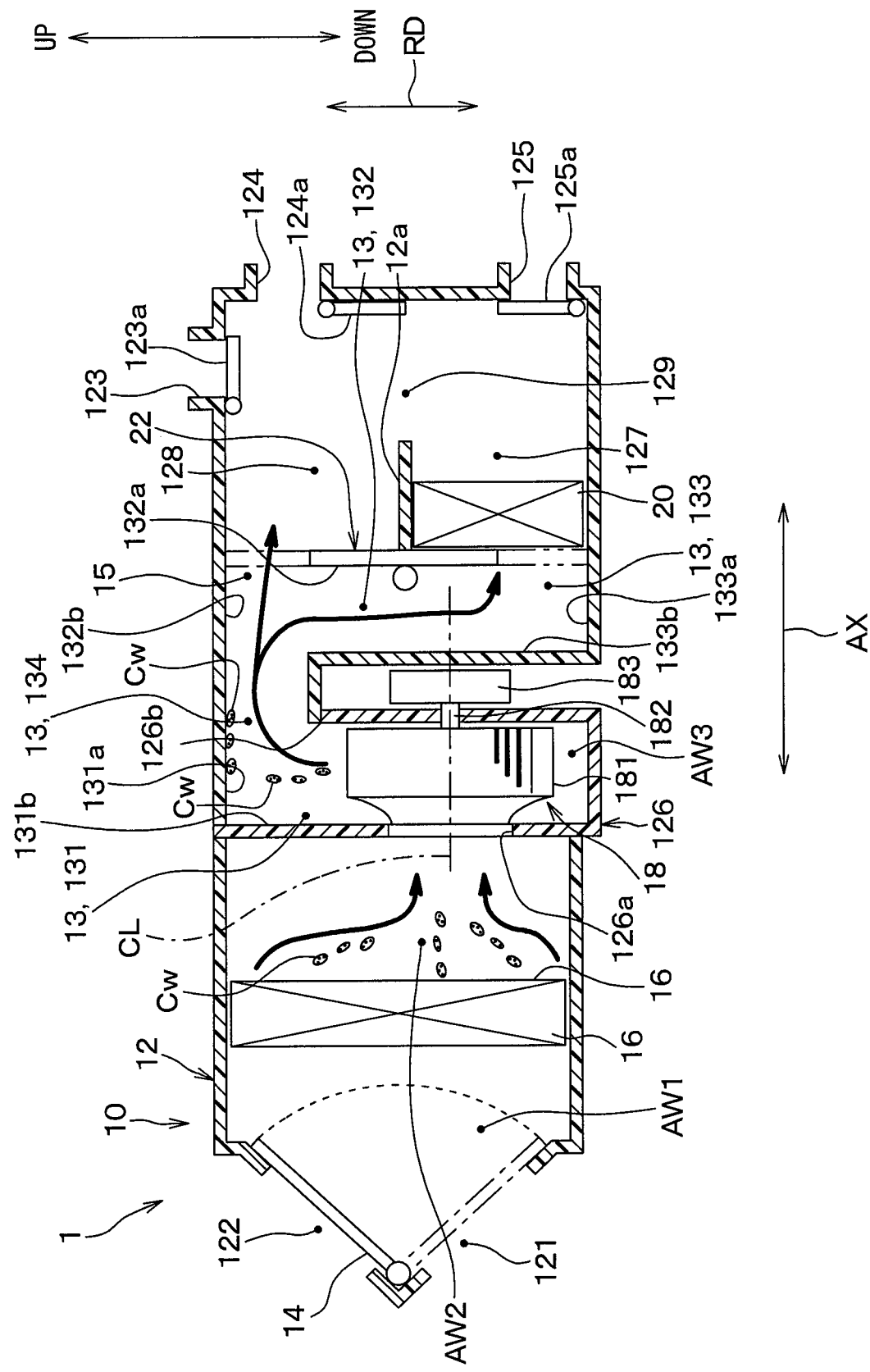
FIG. 7 is a cross-sectional view schematically illustrating flows of air in the air-conditioning unit for a vehicle with an air mix door located at an intermediate position according to the third embodiment.

A third embodiment will be described hereafter with reference to FIG. 6 and FIG. 7. FIG. 6 and FIG. 7 each is a cross-sectional view schematically illustrating the air-conditioning unit 10 with the air mix door 22 located at the intermediate position. FIG. 6 and FIG. 7 each shows, as an example, a configuration in a situation where the controller 50 controls the inside-outside air door 14 to open the outside-air inlet portion 121 and controls the face switching door 124a to open the face opening 124.

As shown in FIG. 6, an air-conditioning unit 10 in the present embodiment is different from that in the first embodiment in a point that the evaporator 16 and the heater core 20 are arranged to overlap with each other along the axial direction AX of the rotary shaft 182 of the blower 18.

Specifically, in the air-conditioning unit 10 of the present embodiment, the evaporator 16 is arranged so that the thickness direction of the heat exchanging portion, in which the refrigerant and the air exchange heat with each other, intersects with the up-down direction. For example, the thickness direction of the heat exchanging portion may be perpendicular to the up-down direction. In the present embodiment, the blower 18 of the air-conditioning unit 10 is arranged so that the axial direction AX of the rotary shaft 182 is parallel to the thickness direction of the evaporator 16. That is, in the present embodiment, the blower 18 is arranged so that the axial direction AX of the rotary shaft 182 intersects with the up-down direction. As an example, the axial direction AX may be perpendicular to the up-down direction.

The before-heating passage 13 is curved so that a flow direction of air discharged from the blower 18 is changed to a direction parallel to the axial direction AX of the rotary shaft 182, further changed to the radial direction RD of the rotary shaft 182, and further changed to a direction parallel to the axial direction AX of the rotary shaft 182. Specifically, the before-heating passage 13 in the present embodiment includes three flow-changing paths respectively defined in an upstream portion, a middle portion, and a downstream portion. The warm-air passage 127 and the cool-air bypass passage 128 are arranged side-by-side on a downstream side of the before-heating passage 13 in the present embodiment.

More specifically, the before-heating passage 13 in the present embodiment includes, as flow-changing paths changing flow directions, an upstream flow-changing path 131, an intermediate flow-changing path 132, and a downstream flow-changing path 133.

The upstream flow-changing path 131 changes a flow direction of air discharged from the blower 18 to a direction intersecting with the flow direction of air discharged from the blower 18. The upstream flow-changing path 131 is defined by wall surfaces including a passage wall surface 131a and a passage wall surface 131b. The passage wall surface 131a faces the air discharge port 126b of the blower 18. The passage wall surface 131b is a surface of a wall that partitions the cool-air passage AW2 and the before-heating passage 13 from each other. The passage wall surfaces 131a and 131b defining the upstream flow-changing path 131 intersect with each other to form a corner.

The intermediate flow-changing path 132 intersects with the up-stream flow-changing path 131. The intermediate flow-changing path 132 is defined by the door plate surface 132a of the air mix door 22 and a passage wall surface 132b. The passage wall surface 132b is connected to the passage wall surface 131a defining the upstream flow-changing path 131. The door plate surface 132a and the passage wall surface 132b defining the intermediate flow-changing path 132 intersect with each other.

Specifically, each of the upstream flow-changing path 131 and the intermediate flow-changing path 132 is formed in an L-shape, i.e., is bent at a right angle. As such, each of the upstream flow-changing path 131 and the intermediate flow-changing path 132 changes a flow direction of air so that a path of the air draws the L-shape, i.e., the flow direction of air is changed at a right angle. The upstream flow-changing path 131 and the intermediate flow-changing path 132 intersect with each other so that air discharged from the blower 18 takes a U-turn.

A narrow path 134 is defined between the upstream flow-changing path 131 and the intermediate flow-changing path 132. The narrow path 134 has a passage width Ws that is smaller than a passage width Wl of the air discharge port 126b of the blower 18. The narrow path 134 extends along the axial direction AX of the blower 18.

The downstream flow-changing path 133 intersects with the intermediate flow-changing path 132. The downstream flow-changing path 133 is defined by wall surfaces including a passage wall surface 133a and a passage wall surface 133b. The passage wall surface 133a faces the intermediate flow-changing path 132. The passage wall surface 133b faces the heater core 20. The passage wall surfaces 133a and 133b defining the downstream flow-changing path 133 intersect with each other to form a corner.

Specifically, the downstream flow-changing path 133 is formed in an L-shape, i.e., is bent at a right angle. As such, the downstream flow-changing path 133 changes a flow direction of air so that a path of the air draws the L-shape, i.e., the flow direction of air is changed at a right angle. The downstream flow-changing path 133 extends to make air, after passing through the intermediate flow-changing path 132, to turn at a right angle, i.e., to turn along an L-shaped path.

The passage wall surface 133b defining the downstream flow-changing path 133 serves as a partition wall that partitions the flow path AW3, in which the blower 18 is disposed, and the warm-air passage 127, in which the heater core 20 is disposed, from each other. In other words, the heater core 20 faces the blower 18 via the passage wall surface 133b defining the downstream flow-changing path 133.

In the present embodiment, the warm-air passage 127 is connected to the flow-changing paths 131 to 133 in the before-heating passage 13. In the present embodiment, the cool-air bypass passage 128 is connected to the pre-bypass passage 15 that is defined in the outer portion of the before-heating passage 13.

In the present embodiment, the case 12 defines the ventilation passage so that each of the warm-air passage 127 and the cool-air bypass passage 128 overlaps with the cool-air passage AW2, in which the evaporator 16 is disposed, along the axial direction AX of the rotary shaft 182.

As such, the heater core 20 disposed in the warm-air passage 127 overlaps with the evaporator 16 along the axial direction AX of the rotary shaft 182. Similar to the evaporator 16, the heater core 20 is arranged so that the thickness direction of the heat exchanging portion, in which the refrigerant and the air exchange heat with each other, intersects with the up-down direction. For example, the thickness direction of the heat exchanging portion may be perpendicular to the up-down direction.

In the present embodiment, the air mix door 22 is disposed in the before-heating passage 13. The air mix door 22 in the present embodiment is a slide door that includes a plate member that is slidable along a plate surface direction. Alternatively, the air mix door 22 may be configured by a cantilever door that includes a plate member and a door shaft coupled to one side of the plate member, similar to the first embodiment.

Here, a passage length (Lb+Lh) from the air discharge port 126b of the blower 18 to an inlet of the warm-air passage 127 is longer than a passage length (Lb+Lc) from the air discharge port 126b of the blower 18 to an inlet of the cool-air bypass passage 128. Specifically, a passage length Lh from the narrow path 134 to the inlet of the warm-air passage 127 is longer than a passage length Lc from the narrow path 134 to the inlet of the cool-air bypass passage 128.

Other structures are similar to corresponding structures of the first and second embodiments. As shown in FIG. 7, in the air-conditioning unit 10 of the present embodiment, air is taken into the case 12 from the outside-air inlet portion 121 when the blower 18 is rotating. The air is cooled, while passing through the evaporator 16, by exchanging heat with the refrigerant circulating in the evaporator 16. In this situation, moisture in the air is condensed and attached to the surface of the evaporator 16 as the condensed water Cw.

Cooled air cooled in the evaporator 16 is drawn into the blower 18 along the axial direction Ax of the rotary shaft 182 together with the condensed water Cw generated on the surface of the evaporator 16. The air containing the condensed water Cw is drawn into the blower 18 and discharged from the blower 18 radially outward along the radial direction RD of the rotary shaft 182.

The air discharged from the blower 18 turns, i.e., a flow direction of the air is changed, in the before-heating passage 13, and then flows to both of the warm-air passage 127 and the cool-air bypass passage 128. The condensed water Cw discharged from the blower 18 with the air flows straight along the radial direction RD of the rotary shaft 182 due to inertia and is attached to wall surfaces such as the passage wall surface 131a or the like of the up-stream flow-changing path 131. That is, when the air containing the condensed water Cw is discharged from the blower 18, the condensed water Cw is separated from the air in the before-heating passage 13 and only the air flows to both of the warm-air passage 127 and the cool-air bypass passage 128.

As such, according to the air-conditioning unit 10 in the present embodiment, the condensed water Cw hardly flows into the warm-air passage 127 in which the heater core 20 is disposed, similar to the air-conditioning unit 10 of the first and second embodiments.

Thus, according to the air-conditioning unit 10 of the present embodiment, it can be suppressed that water is attached to the heater core 20 located downstream of the before-heating passage 13. As a result, it can be suppressed that unpleasant humid air is supplied into the cabin. That is, the air-conditioning unit 10 in the present embodiment and the air-conditioning unit in the first and second embodiments have common configurations. Therefore, the air-conditioning unit 10 in the present embodiment can obtain the same effects as the air-conditioning unit 10 in the first and second embodiments by the common configurations.

In particular, in the air-conditioning unit 10 of the present embodiment, the evaporator 16 and the heater core 20 overlap with each other along the axial direction AX of the rotary shaft 182 of the blower 18. Generally, the evaporator 16 and the heater core 20 occupy certain volume of the case 12. Then, by arranging the evaporator 16 and the heater core 20 to overlap with each other along the axial direction AX of the rotary shaft 182 of the blower 18, a size of the air-conditioning unit 10 in the radial direction RD of the rotary shaft 182 can be reduced. As such, the air-conditioning unit 10 in the present embodiment is preferably installed in a vehicle that has a limited space along the radial direction RD of the rotary shaft 182 of the blower 18 for housing devices.

The air-conditioning unit 10 in the present embodiment is configured to have the before-heating passage 13 including the upstream flow-changing path 131, the intermediate flow-changing path 132, and the downstream flow-changing path 133. According to this configuration, water flowing in the case 12 with air can be easily attached to a wall surface defining any one of the upstream flow-changing path 131, the intermediate flow-changing path 132, and the downstream flow-changing path 133. As a result, it can be effectively suppressed that the water is attached to the heater core 20.

In the air-conditioning unit 10 of the present embodiment, the narrow path 134 having the narrow passage width Ws is defined between the up-stream flow-changing path 131 and the intermediate flow-changing path 132. Since the before-heating passage 13 includes the narrow path 134, water flowing in the case 12 with air can be easily attached to a wall surface defining the narrow path 134.

In the air-conditioning unit 10 of the present embodiment, the passage length Lh from the narrow path 134 to the warm-air passage 127 is longer than the passage length Lc from the narrow path 134 to the cool-air bypass passage 128. As such, even when water comes in the narrow path 134 with air, the water can be prevented from flowing into the warm-air passage 127.

Other Embodiments

Although the representative embodiments of the present disclosure have been described above, the present disclosure should not be limited to the above-described embodiments. For example, various modifications can be made as follows.

In the above-described first and second embodiments, the before-heating passage 13 as a whole is a curved path curved in the L-shape as an example. However, the structure of the before-heating passage 13 is not limited to this example. As an example, a part of the before-heating passage 13 may be curved to have an L-shape. As another example, the before-heating passage 13 is not limited to be the curved path curved in the L-shape and may be a curved path curved in a C-shape or an S-shape.

As described in the above-described embodiments, the fan 181 of the blower 18 is a turbofan having a highest static pressure among centrifugal fans preferably, however not being limited to be the turbofan. As an example, the fan 181 of the blower 18 may be another fan such as a sirocco fan or a radial fan.

As described in the above-described embodiments, the fan 181 of the blower 18 is a centrifugal fan preferably, however not being limited to be the centrifugal fan. As an example, the fan 181 of the blower 18 may be an axial fan.

In the above-described embodiments, the evaporator 16 is disposed as the cooling heat exchanger that cools air flowing in the case 12. However, any heat exchangers other than the evaporator 16 may be used as the cooling heat exchanger.

As described in the above-described embodiments, the evaporator 16 and the blower 18 are arranged so that the air outlet surface 161 of the evaporator 16 overlaps with the air suction port 126a of the blower 18 along the axial direction AX of the rotary shaft 182 preferably. However, in the air-conditioning unit 10, the evaporator 16 and the blower 18 may be arranged so that the air outlet surface 161 of the evaporator 16 does not overlap with the air suction port 126a of the blower 18 along the axial direction AX of the rotary shaft 182.

In the above-described embodiments, the heater core 20 is disposed as the heating heat exchanger that heats air flowing in the case 12. However, any heat exchangers other than the heater core 20 may be used as the heating heat exchanger.

In the above-described embodiments, the cool-air bypass passage 128 is defined downstream of the before-heating passage 13 in the case 12 as an example. However, the air-conditioning unit 10 may be configured so that only the warm-air passage 127 is defined downstream of the before-heating passage 13. In such case, the air mix door 22 of the air-conditioning unit 10 may be unnecessary.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as departure from the disclosure, and all such modifications are intended to be included within the scope of the disclosure.

Example embodiments are provided so that this disclosure will be through, and will convey the scope to those who are skilled in the art. Numerous specific details are set forth such as examples of specific components, devices, and methods, to provide a through understanding of embodiments of the present disclosure. It will be apparent to those skilled in the art that specific details need not be employed, that example embodiments may be embodied in many different forms and that neither should be construed to limit the scope of the disclosure. In some example embodiments, well-known processors, well-known device structures, and well-known technologies are not described in detail.

The constituent element(s) of each of the above embodiments is/are not necessarily essential unless it is specifically stated that the constituent element(s) is/are essential in the above embodiment, or unless the constituent element(s) is/are obviously essential in principle.

Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure.

The technology used herein is for the purpose of describing particular example embodiments only and is not intended to be limiting. As used herein, the singular forms "a," and "an," and "the" may be intended to include the plural forms as well, unless the context clearly indicates otherwise. The terms "comprises," "comprising," "including," and "having," are integers, steps, operations, elements, and/or components, but do not preclude the presence or addition of one or more other features, integers, steps, operations, elements, components, and/or groups thereof.

The method steps, processers, and operations described herein are not to be construed as necessarily requiring their performance in the particular order discussed or illustrated, unless specifically identified as an order of performance. It is also to be understood that additional or alternative steps may be employed. As used herein, the terms "and/or" includes any and all combinations of one or more of the associated listed items.

CONCLUSION

In a first aspect described as a part or a whole of the above-described embodiments, an air-conditioning unit for a vehicle includes a blower, a cooling heat exchanger disposed upstream of the blower, and a heating heat exchanger disposed downstream of the blower. The before-heating passage extending from an air outlet of the blower toward an air inlet of the heating heat exchanger is a curved passage at least partially. The curved passage is curved to change a flow direction of air discharged from the blower.

In a second aspect, the air-conditioning unit for a vehicle is configured so that the before-heating passage includes the upstream flow-changing path which guides the air discharged from the blower to flow along a direction intersecting with the flow direction of the air discharged from the blower.

As such, water flowing in the case with air is easily attached to a passage wall surface defining the upstream flow-changing path. As a result, the water can be prevented from flowing to the heating heat exchanger.

In a third aspect, the air-conditioning unit for a vehicle is configured to have the before-heating passage that includes the intermediate flow-changing path intersecting with the upstream flow-changing path. As such, air passing through the upstream flow-changing path with water is easily attached to a passage wall surface defining the intermediate flow-changing path. As a result, the water can be prevented from flowing to the heating heat exchanger more effectively.

In a fourth aspect, according to the air-conditioning unit for a vehicle, the upstream flow-changing path together with the intermediate flow-changing path guides the air discharged from the blower to take a U-turn by intersecting with the intermediate flow-changing path.

As such, water flowing in the case with air is easily attached to passage wall surfaces defining the upstream flow-changing path and the intermediate flow-changing path respectively. As a result, the water can be prevented from attaching to the heating heat exchanger effectively.

In a fifth aspect, the air-conditioning unit for a vehicle is configured to have the before-heating passage that includes the downstream flow-changing path intersecting with the intermediate flow-changing path. Thus, by defining the before-heating passage to include a plurality of flow-changing paths, it can be suppressed certainly that water is attached to the heating heat exchanger.

In a sixth aspect, the downstream flow-changing path 133 extends to make air, after passing through the intermediate flow-changing path 132, to turn at a right angle, i.e., to turn along an L-shaped path in the air-conditioning unit for a vehicle. As such, even when water passes through the upstream flow-changing path and the intermediate flow-changing path without being attached to the passage wall surfaces, the water is easily attached to the passage wall surface defining the downstream flow-changing path. As a result, it can be suppressed certainly that the water is attached to the heating heat exchanger.

In a seventh aspect, the air-conditioning unit for a vehicle is configured to have a blower that includes a fan drawing air along an axial direction of a rotary shaft and discharging the air along a direction intersecting with the axial direction of the rotary shaft. The fan and the heating heat exchanger are arranged not to overlap with each other along a radial direction of the rotary shaft.

In such configuration that the fan of the blower draws air along the axial direction of the rotary shaft and discharge the air along the direction intersecting with the axial direction, airflows discharged from the fan include an airflow flowing along the radial direction of the rotary shaft. By arranging the fan and the heating heat exchanger not to overlap with each other along the radial direction of the rotary shaft considering the characteristic of the fan blowing air as described above, water discharged from the fan with air can be prevented from attaching to the heating heat exchanger effectively.

In an eighth aspect, the air-conditioning unit for a vehicle is configured to have, on a downstream of the before-heating passage, the warm-air passage and the cool-air bypass passage. The warm-air passage directs air, which is discharged from the blower, to the heating heat exchanger. The cool-air bypass passage guides air, which is discharged from the blower, to bypass the heating heat exchanger. The warm-air passage is connected to an inner portion of the flow-changing path of the before-heating passage. The cool-air bypass passage is connected to the outer portion of the flow-changing path of the before-heating passage.

When the air containing water flows in the case, the water is easily directed to the outer side of the flow-changing path of the before-heating passage due to inertia when passing through the flow-changing path of the before-heating passage. By defining the warm-air passage to connect to the inner portion of the flow-changing path, the water can be prevented from attaching to the heating heat exchanger more effectively.

In a ninth aspect, the air-conditioning unit for a vehicle is configured to have, on a downstream of the before-heating passage, the warm-air passage and the cool-air bypass passage. The warm-air passage directs air, which is discharged from the blower, to the heating heat exchanger. The cool-air bypass passage guides air, which is discharged from the blower, to bypass the heating heat exchanger. The passage length from the air discharge port to the inlet of the warm-air passage is longer than the passage length from the air discharge port to the inlet of the cool-air bypass passage.

By setting the passage length reaching the warm-air passage longer than the passage length reaching the cool-air bypass passage, water flowing in the case with air can be prevented from flowing to the warm-air passage.

In a tenth aspect, the air-conditioning unit for a vehicle has the before-heating passage including the narrow path having the passage width smaller than the passage width at the air blowing port. The passage length from the narrow path to the inlet of the warm-air passage is longer than the passage length from the narrow path to the inlet of the cool-air bypass passage.

Since the before-heating passage includes the narrow path, water flowing in the case with air can be easily attached to a wall surface defining the narrow path. Moreover, even when water passes through the narrow path with air, the water can be prevented from flowing into the warm-air passage since the passage length reaching to the warm-air passage is longer than the passage length reaching to the cool-air bypass passage.

In an eleventh aspect, the air-conditioning unit for a vehicle is configured so that the heating heat exchanger is arranged to face the blower via a part of the flow-changing path. In other words, the blower and the heating heat exchanger are separated from each other by the flow-changing path. As such, when water is discharged from the blower with air, the water can be prevented from spattering to the heating heat exchanger.

In a twelfth embodiment, the air-conditioning unit for a vehicle is configured so that the cooling heat exchanger and the heating heat exchanger are arranged to overlap with each other along the axial direction of the rotary shaft of the blower. Generally, the cooling heat exchanger and the heating heat exchanger occupy certain volume of the case. Then, by arranging the cooling heat exchanger and the heating heat exchanger to overlap with each other along the axial direction of the rotary shaft of the blower, a size of the air-conditioning unit for a vehicle in the radial direction of the rotary shaft can be reduced.

In a thirteenth aspect, the air-conditioning unit for a vehicle is configured with the cooling heat exchanger being arranged so that the air outlet surface of the cooling heat exchanger faces the air suction port of the blower. According to this structure, a flow path between the cooling heat exchanger and the blower can be a straight path. As such, a cause of energy loss in the ventilation passage can be suppressed.

What is claimed is:

1. An air-conditioning unit for a vehicle, the air-conditioning unit configured to perform an air conditioning for a cabin of the vehicle, the air-conditioning unit comprising:
   a case that defines a ventilation passage therein through which air flows;
   a blower that is configured to cause a flow of air flowing in the case toward the cabin, the blower including a rotary shaft;
   a cooling heat exchanger that is located upstream of the blower in the case and is configured to cool the air; and
   a heating heat exchanger that is located downstream of the blower in the case and is configured to heat the air, wherein
   the ventilation passage includes a before-heating passage extending from an air discharge port of the blower toward an air inlet of the heating heat exchanger,
   the before-heating passage includes, as at least a part of the before-heating passage, a flow-changing path that is right angled to change a flow direction of the air discharged from the blower, the cooling heat exchanger and the heating heat exchanger are arranged to overlap with each other along an axial direction of the rotary shaft, and air discharged from the blower initially flows in a radial direction of the rotary shaft, is changed to flow in the axial direction of the rotary shaft, is further changed to again flow in the radial direction of the rotary shaft, and is further changed to again flow in the axial direction of the rotary shaft.

2. The air-conditioning unit for a vehicle according to claim 1, wherein
the before-heating passage includes an upstream flow-changing path that guides the air discharged from the blower to flow along a direction intersecting with the flow direction of the air discharged from the blower.

3. The air-conditioning unit for a vehicle according to claim 2, wherein
the before-heating passage includes an intermediate flow-changing path intersecting with the upstream flow-changing path.

4. The air-conditioning unit for a vehicle according to claim 3, wherein
the upstream flow-changing path together with the intermediate flow-changing path guides the air, which is discharged from the blower, to take a U-turn.

5. The air-conditioning unit for a vehicle according to claim 3, wherein
the before-heating passage includes a downstream flow-changing path intersecting with the intermediate flow-changing path.

6. The air-conditioning unit for a vehicle according to claim 5, wherein
the downstream flow-changing path guides the air after passing through the intermediate flow-changing path to take a turn along a right angled path.

7. The air-conditioning unit for a vehicle according to claim 1, wherein
the ventilation passage includes
a warm-air passage that directs the air discharged from the blower to the heating heat exchanger and
a cool-air bypass passage that guides the air discharged from the blower to bypass the heating heat exchanger,
the warm-air passage and the cool-air bypass passage are arranged side-by-side on a downstream side of the before-heating passage,
the warm-air passage is connected to an inner portion of the flow-changing path of the before-heating passage, and
the cool-air bypass passage is connected to an outer portion of the flow-changing path of the before-heating passage.

8. The air-conditioning unit for a vehicle according to claim 1, wherein
the ventilation passage includes
a warm-air passage that directs the air discharged from the blower to the heating heat exchanger and
a cool-air bypass passage that guides the air discharged from the blower to bypass the heating heat exchanger,
the warm-air passage and the cool-air bypass passage are arranged side-by-side on a downstream side of the before-heating passage, and
a passage length from the air discharge port of the blower to an inlet of the warm-air passage is longer than a passage length from the air discharge port of the blower to an inlet of the cool-air bypass passage.

9. The air-conditioning unit for a vehicle according to claim 8, wherein
the before-heating passage includes a narrow path having a smaller passage width as compared to the air discharge port of the blower, and
a passage length from the narrow path to the inlet of the warm-air passage is longer than a passage length from the narrow path to the inlet of the cool-air bypass passage.

10. The air-conditioning unit for a vehicle according to claim 1, wherein
the case includes a portion defining a part of the flow-changing path, and
the heating heat exchanger faces the blower with the portion of the case located between the heating heat exchanger and the blower.

11. The air-conditioning unit for a vehicle according to claim 1, wherein
the blower further includes a fan,
the fan draws air along the axial direction of the rotary shaft and blows the air along a direction intersecting with the axial direction, and
the fan and the heating heat exchanger are arranged without overlapping with each other along a radial direction of the rotary shaft.

12. The air-conditioning unit for a vehicle according to claim 1, wherein
the cooling heat exchanger includes an air outlet surface facing an air suction port of the blower.

13. The air-conditioning unit for a vehicle according to claim 1, wherein
an entire portion of the before-heating passage extending from the air discharge port of the blower to an air inlet of the heating heat exchanger serves as the flow-changing path, which reflects an entire amount of air discharged from the blower, and makes a 90 degree turn.

14. The air-conditioning unit for a vehicle according to claim 1, wherein
the before-heating passage includes an upstream flow-changing path that guides the air discharged from the blower, an intermediate flow-changing path intersecting with the upstream flow-changing path and a downstream flow-changing path intersecting with the intermediate flow-changing path.

15. An air-conditioning unit for a vehicle, the air-conditioning unit configured to perform an air conditioning for a cabin of the vehicle, the air-conditioning unit comprising:
a case that defines a ventilation passage therein through which air flows;
a blower that is configured to cause a flow of air flowing in the case toward the cabin, the blower including a rotary shaft;
a cooling heat exchanger that is located upstream of the blower in the case and is configured to cool the air; and
a heating heat exchanger that is located downstream of the blower in the case and is configured to heat the air, wherein
the ventilation passage includes a before-heating passage extending from an air discharge port of the blower toward an air inlet of the heating heat exchanger,
the before-heating passage includes, as at least a part of the before-heating passage, a flow-changing path that is right angled to change a flow direction of the air discharged from the blower, the cooling heat exchanger and the heating heat exchanger are arranged to overlap with each other along an axial direction of the rotary shaft, the before-heating passage includes an upstream flow-changing path that guides the air discharged from the blower, an intermediate flow-changing path intersecting with the upstream flow-changing path and a downstream flow-changing path intersecting with the intermediate flow-changing path, the upstream flow-changing path is defined by a first passage wall surface and a second passage wall surface, the first passage wall surface opposes the air discharge port of the blower, the second passage wall surface partitions a cool-air passage and the before-heating passage from each other, the first passage wall surface and the second passage wall surface intersect with each other to form a corner, the intermediate flow-changing path is defined by a door plate surface of an air mix door and a passage wall surface, the passage wall surface is connected to the first passage wall surface of the upstream flow-changing path, the door plate surface and the passage wall surface are configured to intersect with each other, and the downstream flow-changing path is defined by a first passage wall surface and a second passage wall surface, the first passage wall surface opposes the intermediate flow-changing path, the second passage wall surface opposes the heating heat exchanger, the door plate surface and the first passage wall surface are configured to intersect with each other, the first passage wall surface and the second passage wall surface intersect with each other to form a corner.

* * * * *